3,277,184
PHENOL PRODUCTION
Lloyd B. Ryland, El Cerrito, and Theodore W. Evans, Oakland, Calif., assignors to Shell Oil Company, New York, N.Y., a corporation of Delaware
No Drawing. Filed Sept. 30, 1963, Ser. No. 312,330
7 Claims. (Cl. 260—621)

This invention relates to an improved process for the production of phenol. More particularly it relates to an improved method for the production of phenol from benzoic acid.

The recent increase in industrial requirements for phenol have led to the development of a number of methods for the production of this material. Methods are available in the art for the production of phenol from benzoic acid, which is customarily obtained by oxidation of an alkyl benzene such as toluene. Kaeding et al., U.S. Re. 24,848, disclose a liquid-phase conversion of benzoic acid to phenol by the action of oxygen and steam in the presence of soluble copper salts and with the optional addition of soluble alkali metal or alkaline earth metal salts. Pearlman, U.S. 2,727,924, also discloses a liquid-phase process which relates primarily to conversion of dicarboxylic aromatic compounds, particularly dicarboxylic acids, to phenol and hydroxybenzoic acids.

It is the object of this invention to provide an improved process for the production of phenol. A more particular object is to provide an improved process for the liquid-phase conversion of benzoic acid to phenol.

It has now been found that these objects are accomplished by the process of contacting benzoic acid with oxygen and steam in the presence of certain metallic salts as catalyst. The process of the invention results in the efficient production of phenol at a comparably high rate.

The process of the invention comprises passing a mixture of oxygen and steam through molten benzoic acid in which certain metallic salts have been dissolved. Salts that are suitable are benzoates, which may be added to the reaction mixture as preformed materials, or alternatively may be prepared in situ by adding to the reaction mixture a compound containing the desired metal, preferably the metal oxide or hydroxide, which reacts with the benzoic acid to form the metal benzoate catalyst.

It has been found to be critical that the reaction mixture contain copper benzoate or a precursor thereof, since the reaction process does not readily occur when copper is not present. The copper may be employed in either the cuprous or cupric oxidation state. Although the function of the catalyst is not completely understood, it appears that the copper is responsible for the primary catalytic activity, the other catalyst components serving at least in part to promote or enhance the catalytic activity of the copper. The required amount of copper is not necessarily large; catalytic quantities appear to be sufficient. In many cases, amounts of copper benzoate as low as 0.001 mole of copper benzoate per mole of benzoic acid are sufficient. Although no apparent detriment arises from the utilization of large amounts of copper benzoate, amounts greater than about 0.2 mole per mole of benzoic acid appear to offer no further practical advantage. Best results are obtained when amounts of copper benzoate from about 0.01 mole to about 0.08 mole per mole of benzoic acid are employed.

The process of the invention is further characterized by the presence in the reaction mixture of rare earth benzoate. By the term "rare earth" is meant that group of transition metals having atomic numbers from 57 to 71, inclusive. It has been found that the presence of rare earth benzoate greatly enhances the rate of the reaction process, in some cases even substantially doubling the rate of phenol production. Illustrative rare earth benzoates which are useful as promoters or co-catalysts includes the benzoates of lanthanum, cerium, praseodymium, neodymium, europium, holmium, samarium and gadolinium or mixtures thereof. When a single rare earth benzoate is employed, particularly advantageous use is made of cerium benzoate, especially ceric benzoate. It is also frequently useful to employ mixtures of rare earth benzoates. Particular advantage is made of benzoates prepared from the commercially available mixture of rare earth oxides known as didymium oxide. Didymium oxide is frequently given the formula $Di_2O_3$, the term "didymium" being given the pseudo chemical symbol Di. This mixture of rare earth oxides is of variable composition, depending primarily on the commercial source of the mixture, but contains mainly lanthanum and neodymium oxides, with lesser percentages of praseodymium, samarium, gadolinium and cerium oxides. Typical composition ranges of didymium oxide are as follows: 28–46% $La_2O_3$, 9–11% $Pr_6O_{11}$, 32–38% $Nd_2O_3$, 5–6% $Sm_2O_3$, 3–4% $Gd_2O_3$, 1–6% $CeO_2$ and 1–2% of other rare earth oxides. The optimum amount of rare earth benzoate will depend upon the particular benzoate employed as well as the particular reaction conditions utilized. Molar amounts of rare earth benzoate to copper benzoate from about 5:1 to about 1:5 are satisfactory, although it is frequently advantageous to employ ratios of rare earth benzoate to copper benzote that are substantially equimolar, that is, a molar ratio of about 1:1.

The process of the invention is operable in the presence of other additional metal benzoates, e.g., alkali metal benzoates such as lithium benzoate, alkaline earth benzoates such as magnesium benzoate and transition metal benzoates such as cobalt benzoate, as such addiitonal catalyst components do not appear to be detrimental. The presence of additional catalyst components does not appear to offer any substantial advantages, however, and in the preferred modification, the catalyst comprises a mixture of copper and rare earth benzoates.

In the presence of the metal benzoate catalyst, the benzoic acid is contacted with oxygen, customarily by passing an oxygen-containing gas into a mixture of benzoic acid and metal benzoates. The oxygen-containing gas may comprise essentially pure oxygen, or may comprise a mixture of oxygen with substantial quantities of non-reactive gaseous diluents. From economic reasons, the utilization of air as the oxygen-containing gas is to be preferred as the other components of air are seemingly not detrimental to the reaction process. The optimum amount of oxygen to be introduced into the reaction mixture will depend upon the amount of benzoic acid present. Although the overall amount of oxygen employed will in part determine the yield of phenol product, of greater criticality from process efficiency considerations is the rate at which the oxygen is introduced, as rates of oxygen introduction that are too low result in unnecessarily diminished rate of reaction and rates of oxygen introduction that are too high result in a greater probability of side reactions resulting in the formation of tarry or other undesirable products. For convenience, the rate of oxygen introduction is measured at ambient room temperature and pressure, and, independent of the oxygen source, rates of oxygen introduction from about 0.005 to about 0.5 liter of oxygen per minute per mole of benzoic acid are satisfactory, while rates of oxygen introduction from about 0.01 to about 0.3 liter of oxygen per minute per mole of benzoic acid are preferred.

The process of the invention is conducted in the presence of water, which under the conditions of the reaction is present in the form of steam. The steam serves in part to hydrolyze the ester phenyl benzoate, which forms as a secondary reaction product when phenol is produced in the presence of excess benzoic acid, thereby increasing the efficiency of the phenol production, but the steam may also be utilized to aid removal of the phenol product from the reaction mixture by facilitating a steam distillation of the phenol. The amount of water to be employed and the rate of the introduction thereof will depend upon the amount of oxygen introduced per unit time, but the water is preferably present in molar excess over the oxygen. Molar ratios of water to oxygen from about 2:1 to about 20:1 are satisfactory, although molar ratios of water to oxygen from about 5:1 to about 15:1 are preferred.

The process of the invention is conducted by passing the oxygen-containing gas and the steam into a mixture of the benzoic acid and catalyst which mixture is at reaction temperature. To obtain satisfactory rates of reaction, temperatures are employed at which the benzoic acid is molten, and best results are obtained when reaction temperatures approaching the boiling point of the benzoic acid are employed. Care must be taken to avoid temperatures that are too high, as excessive vaporization of the benzoic acid results in contamination of the phenol product. When the reaction is conducted at atmospheric pressure, reaction temperatures above about 200° C. but below about 245° C. are satisfactory, although temperatures from about 210° C. to about 240° C. are preferred. The reaction is conducted at atmospheric pressure or at superatmospheric pressure, so long as the benzoic acid is maintained in the liquid phase, thus, somewhat higher reaction temperatures are permitted if superatmospheric pressure is employed. For convenience however, the use of reaction pressures that are substantially atmospheric is preferred.

The oxygen and water may be introduced separately into the reaction mixture, but are preferably mixed prior to or simultaneously with the introduction. Best results are obtained when the water is completely vaporized before contacting the benzoic acid, and it is further preferred to mix the oxygen and steam and to preheat the gaseous mixture, e.g., to a temperature of about 180° C. to about 200° C., prior to contacting the benzoic acid, thereby maintaining a more uniform temperature throughout the reaction mixture.

The process of the invention is adaptable for batchwise or continuous operation. A typical batchwise procedure comprises charging the benzoic acid and catalysts to a reactor equipped with a gas inlet to allow entry of the oxygen-containing gas-steam mixture and an outlet to permit the removal of unreacted oxygen and steam as well as the phenol product produced in the reactor. The effluent from the reactor is then cooled to condense the water and organic products which are subsequently separated by such conventional means as selective extraction or fractional distillation. Alternatively, the reaction process may be adapted for operation in a continuous manner, as by continuously adding benzoic acid to the reactor to replace the phenol distilled therefrom. In this manner, relatively small amounts of metal benzoate serve to effect the conversion of comparably large amounts of benzoic acid.

To further illustrate the improved process of the invention, the following examples are provided. It should be understood that they are not to be regarded as limitations, as the teachings thereof may be varied as will be understood by one skilled in this art.

*Example I*

To a kettle equipped with a gas inlet and a vacuum-jacketed still with a take-off head was charged 61 g. of benzoic acid, 8 g. of ceric benzoate and 4 g. of copper benzoate. Air at the rate of approximately 0.130 liter per minute, measured at room temperature and pressure, and water at the rate of about 0.44–0.95 gram per minute were mixed, preheated to about 200° C., and passed into the benzoic acid-catalyst mixture. The kettle temperature varied from 221° C. to 242° C. and the still head temperature varied from 95.8 C. to 97.4° C. over the 7 hour 44 minute period of reaction. The distillate from the still was collected, and was analyzed at intervals for phenol and for benzoic acid. The distillate contained less than 1% benzoic acid. The rate of phenol production during the entire reaction period was 18.0 meq. of phenol per mole of charged benzoic acid per hour, and the overall yield (conversion×selectivity) of phenol was 14%, based upon benzoic acid charged.

Similar results are obtained when the cerium and copper are introduced to the reaction mixture as the hydroxides, or when an equivalent amount of didymium is substituted for the cerium.

*Example II*

When the procedure of Example I was followed to react benzoic acid with oxygen in the presence of copper benzoate as the sole catalyst, the rate of phenol production was 9.37 meq. phenol per mole of benzoic acid per hour. When the reaction was conducted in the presence of copper benzoate and magnesium benzoate, a rate of phenol production of 15.7 meq. of phenol per mole benzoic acid per hour was observed, while with a mixture of cerium benzoate and magnesium benzoate as catalyst the rate was 0.017 meq. of phenol per mole of benzoic acid per hour, and the use of cerium benzoate alone afforded a rate of phenol production of 0.088 meq. phenol per mole of benzoic acid per hour.

We claim as our invention:

1. The process for the production of phenol by contacting molten benzoic acid with oxygen-containing gas and steam in the presence of catalytic quantities of copper benzoate and rare earth benzoate at a temperature from about 200° C. to about 240° C.

2. The process of claim 1 wherein the oxygen-containing gas is air.

3. The process of claim 1 wherein the rare earth is cerium.

4. The process of claim 1 wherein the rare earth is didymium.

5. The process for the production of phenol by contacting molten benzoic acid with a mixture of air and steam, said mixture being preheated to about 180–200° C., in the presence of catalytic quantities of copper benzoate and rare earth benzoate, at a temperature of from about 200° C. to about 240° C., condensing the effluent resulting from said contacting and recovering phenol from the condensate thereby produced.

6. The process of claim 5 wherein the rare earth is cerium.

7. The process of claim 5 wherein the rare earth is didymium.

References Cited by the Examiner

UNITED STATES PATENTS 2,852,567  9/1958  Barnard et al. _____ 260—621

FOREIGN PATENTS 978,918  1/1965  Great Britain.

LEON ZITVER, *Primary Examiner.*

D. M. HELFER, *Assistant Examiner.*